A. COHN & L. H. DEBS.
STRAINER.
APPLICATION FILED MAR. 7, 1916.

1,221,683.

Patented Apr. 3, 1917.

Witness:
J. C. Higham.

Inventors:
Albert Cohn
Louis H. Debs
by Banning & Banning
Attys.

UNITED STATES PATENT OFFICE.

ALBERT COHN AND LOUIS H. DEBS, OF CHICAGO, ILLINOIS.

STRAINER.

1,221,683.    Specification of Letters Patent.    Patented Apr. 3, 1917.

Application filed March 7, 1916. Serial No. 82,649.

*To all whom it may concern:*

Be it known that we, ALBERT COHN and LOUIS H. DEBS, citizens of the United States, residing at Chicago, in the county of Cook and State of Illinois, have invented certain new and useful Improvements in Strainers, of which the following is a specification.

This invention relates to a strainer adapted for use with receptacles, such, for instance, as coffee pots, and is concerned particularly with the strainer construction and the means for holding it in place.

Our invention includes, among its objects, the construction of a strainer readily attachable or detachable as often as desired; a strainer equipped with means for holding it tightly in position so as to prevent leakage of particles therearound; a strainer in which the holding means serve also as a catch for the receptacle lid; and a strainer which is simple and durable in construction, and economical of manufacture as well. These and other objects of our invention will more fully hereinafter appear from the specification and claims, and from the drawing in which:

Figure 1:
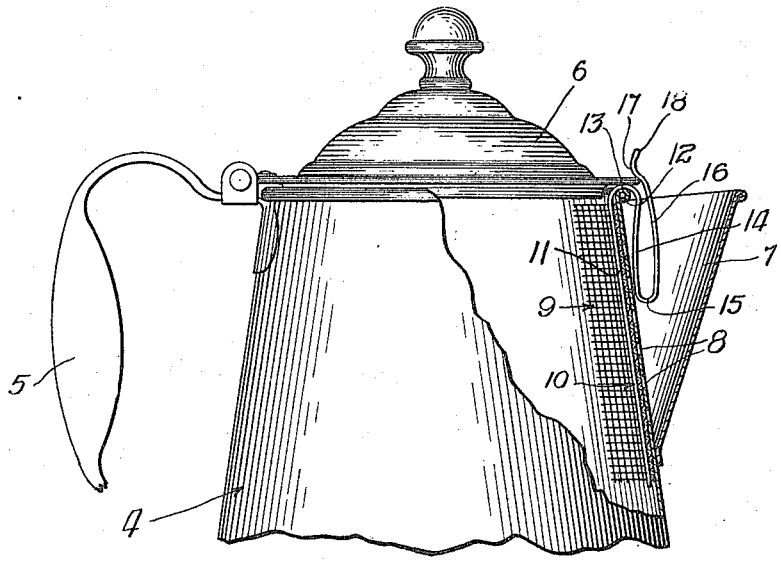
Figure 1 is an elevation of an ordinary coffee pot, a portion thereof being broken away to exhibit in section the strainer of our invention applied in position.

The device of our invention is illustrated in connection with an ordinary coffee pot equipped with a handle 5, a lid 6, and a pouring spout 7. The perforations 8 ordinarily provided in the wall of the pot adjacent the spout being insufficient to strain the liquid, we have provided a strainer 9 arranged to fit within the pot adjacent the perforations 8, this strainer being the subject matter of the present invention.

Figure 2:
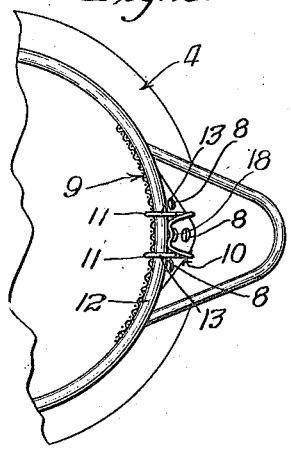
Fig. 2 is a fragmentary view of the coffee pot showing in plan the strainer applied in position.

The strainer may be formed of a suitable wire mesh, or other foraminous material adapted to prevent passage therethrough of particles. As shown in Figs. 1 and 2, a wire holder 10 is secured to the strainer by any approved means such, for instance, as by soldering or brazing. This holder consists preferably of a pair of arms 11 (see Fig. 2), each secured to the strainer at points relatively near its upper and lower edges. It is desirable that this wire holder should be formed of spring material for the purpose of insuring the retention of the lower edge of the strainer against the walls of the pot when the holder is clamped over the upper edge 12 of the pot in a manner to be presently explained. At their upper ends the arms 11 project slightly beyond the upper edge of the strainer, being looped around as at 13 and bent downwardly again as at 14 to engage with the exterior surface of the pot. It will be observed that the portions 14 of the holder are so shaped as to lie at their lower extremities relatively close to the arms 11. As the holder is formed of spring material, these portions 14 are capable of being sprung away from the arms 11 in order to pass over the edge 12 of the pot into clamping position. The upper pot edge designated as 12 is ordinarily rounded and beaded as shown in Figs. 1 and 3.

Figure 3:
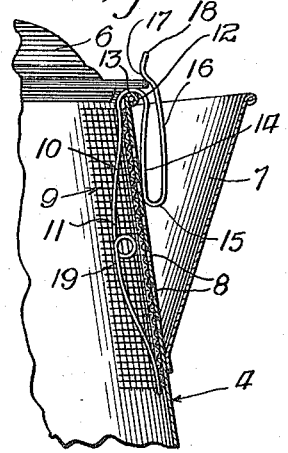
Fig. 3 is a fragmentary view showing in cross section a coffee pot equipped with the present strainer, the holder thereof being of slightly modified construction.

The lower ends of the portions 14 of the spring holder are looped around as at 15 to provide upwardly extending portions 16, which near their extremity are provided with a crimp or inward bend 17, as best shown in Figs. 1 and 3. As appears from Fig. 2, the holder is looped across at 18 in a manner to permit the entire holder to be formed of a single piece of wire. This crimped portion 18 serves as a catch for the receptacle lid 6 to hold it firmly in place. The entire holder is formed of spring material, the catch swinging from a point adjacent the loop 15 to normally retain the lid in place. Under sufficient pressure the catch may yield, of course, to permit the lid to swing into and out of engaging position.

In Fig. 3 we have shown a very similar construction, the only difference being in the shape of the holder arms 11 which are bowed as at 19. This construction is advantageous in that it insures a tight retention of the lower edge of the strainer against the interior surface of the pot. Such retention is manifestly necessary, as otherwise particles of matter could pass around the strainer and out through the spout.

From the foregoing description, it is manifest that the present strainer consists of but two elements, viz: the strainer itself and the spring holder. The holder is so constructed and arranged with respect to the strainer as to insure its tight retention against the inner wall of the pot from end to end, thus effectually straining all particles of matter moving toward the perforations 8. The spring holder, moreover, is so arranged as to enable the strainer to be clamped in position, to be held tightly against displacement. The construction of the holder is such, furthermore, as to provide a catch for the lid, thus holding it firmly against movement. As the various portions of the spring holder are capable of yielding under pressure, it is obvious that the entire strainer may readily be removed from the pot, and that the lid may be opened against the tension of the catch. These objects, as we have shown, are attained by the very simple and effective construction of our invention.

We claim:

1. A strainer of the kind described, embodying, in combination, a sheet of strainer material adapted to fit against the side of a receptacle, and a holder for the strainer formed of spring material and arranged to hold the strainer against the receptacle, the holder comprising companion arms secured to the strainer and looped around to overlie one edge of the receptacle and clamp thereupon, whereby the strainer is held firmly against the receptacle, the clamping portions of the holder being upturned to provide a spring catch for the lid of the receptacle, the acting end of the catch being rounded to facilitate movement of the lid in one direction only, substantially as described.

2. A strainer of the kind described, embodying, in combination, a sheet of strainer material adapted to fit against the side of a receptacle, and a holder secured to the strainer and arranged to hold the same tightly against the receptacle, the holder being formed of spring material bent to clamp over an edge of the receptacle, whereby the strainer is firmly held in place, the holder being provided with an upturned portion arranged to engage with the lid of the receptacle to constitute a spring catch therefor, substantially as described.

3. A device of the kind described embodying in combination a strainer adapted to fit upon a receptacle, and a holder for the strainer arranged to hold the same in position upon the receptacle, the holder being provided with a member arranged to engage with the receptacle lid to constitute a catch therefor, substantially as described.

ALBERT COHN.
LOUIS H. DEBS.

Witnesses:
WM. STITZBURG,
S. LOVENHART.